(12) United States Patent
Downey et al.

(10) Patent No.: US 8,246,477 B2
(45) Date of Patent: Aug. 21, 2012

(54) GEAR JOINT WITH SUPER FINISHED SURFACES

(75) Inventors: Adam Downey, Springfield, OH (US); Dale H. Parrett, Springboro, OH (US)

(73) Assignee: Moyno, Inc., Springfield, OH (US)

( * ) Notice: Subject to any disclaimer, the term of this patent is extended or adjusted under 35 U.S.C. 154(b) by 183 days.

(21) Appl. No.: 12/783,645

(22) Filed: May 20, 2010

(65) Prior Publication Data

US 2011/0287845 A1  Nov. 24, 2011

(51) Int. Cl.
*F16D 3/18* (2006.01)
(52) U.S. Cl. ..................................................... 464/151
(58) Field of Classification Search ............... 464/150, 464/151, 154, 156, 158, 159; 418/48
See application file for complete search history.

(56) References Cited

U.S. PATENT DOCUMENTS

| | | |
|---|---|---|
| 2,467,902 A | 4/1949 | McPhee |
| 2,512,764 A | 6/1950 | Byram |
| 2,612,845 A | 10/1952 | Byram et al. |
| 2,688,856 A | 9/1954 | Heisler |
| 3,142,972 A | 8/1964 | Spaulding, Jr. |
| 3,180,227 A | 4/1965 | Schlichthörlein |
| 3,199,311 A | 8/1965 | Hill |
| 3,427,825 A | 2/1969 | John et al. |
| 4,305,596 A | 12/1981 | Unterstrasser |
| 4,491,500 A | 1/1985 | Michaud et al. |
| 4,639,200 A | 1/1987 | Baumbardner et al. |
| 4,705,594 A | 11/1987 | Zobbi et al. |
| 4,818,333 A | 4/1989 | Michaud |
| 4,844,482 A | 7/1989 | Röhm |
| 4,906,327 A | 3/1990 | Michaud et al. |
| 4,907,906 A | 3/1990 | Hantschk |
| 4,909,773 A | 3/1990 | Schlecher et al. |
| 4,932,206 A | 6/1990 | Sawyer et al. |
| 5,085,564 A | 2/1992 | Naylor et al. |
| 5,288,457 A | 2/1994 | Boegel |
| 5,291,130 A | 3/1994 | Kendzior |
| 5,370,514 A | 12/1994 | Morita et al. |
| 5,503,481 A | 4/1996 | Hashimoto et al. |
| 5,549,458 A | 8/1996 | Chapman et al. |
| 5,688,114 A | 11/1997 | Millington et al. |
| 5,722,820 A | 3/1998 | Wild et al. |
| 5,924,929 A | 7/1999 | Silver |

(Continued)

OTHER PUBLICATIONS

"Changing Sliding Friction on Hard Surfaces." School for Champions. Aug. 5, 2009, [online], [retrieved on Nov. 1, 2012] Retrieved from the Internet <URL:http://web.archive.org/web/20090508012505/http://www.school-for-champions.com/science/friction_changing_sliding_hard.htm>.*

(Continued)

*Primary Examiner* — Gregory Binda
*Assistant Examiner* — Josh Skroupa
(74) *Attorney, Agent, or Firm* — Thompson Hine L.L.P.

(57) ABSTRACT

A gear joint with finished surfaces and other enhancements that allows the gear joint to accommodate higher loads. In particular, in one embodiment, the invention is a ball gear system including a ball gear having a spherical surface, a ring gear configured to receive the ball gear therein and be rotationally coupled thereto, and a thrust plate. The thrust plate is configured to be positioned adjacent to the ball gear to take up thrust forces transmitted thereto. The thrust plate has a recess configured to closely receive the spherical surface therein, and the spherical surface has a surface roughness of less than about 10 Ra in microns.

22 Claims, 5 Drawing Sheets

U.S. PATENT DOCUMENTS

| | | | |
|---|---|---|---|
| 6,120,267 | A | 9/2000 | Cunningham |
| 6,196,922 | B1 | 3/2001 | Hantschk et al. |
| 6,352,008 | B1 * | 3/2002 | Matsuoka et al. |
| 6,460,674 | B1 | 10/2002 | Clay |
| 6,491,501 | B1 | 12/2002 | Wild et al. |
| 6,732,606 | B1 | 5/2004 | Zhu et al. |
| 6,962,489 | B2 | 11/2005 | Marielle et al. |
| 2005/0266927 | A1 * | 12/2005 | Kuroda et al. |

OTHER PUBLICATIONS

Moore, A.J.W., and Tegart, J. McG. Relation between Friction and Hardness. Proceedings of the Royal Society of London. Series A, Mathematical and Physical Sciences, vol. 212, No. 1111 (May 22, 1952), pp. 452-458. Q41.L7.*

"Step-by-Step Grease Selection." Noria Corportion. Nov. 24, 2010, [online], [retrieved on Sep. 1, 2012] Retrieved from the Internet <URL: http://web.archive.org/web/20101124104548/http://machinerylubrication.com/Read/798/grease-selection>.*

Kusner, R.E. et al., "Brush Wellman Engineered Materials, Engineering Guide: ToughMet® 3AT {C72900), ToughMet® 3CX (C96900)" (Oct. 2, 2002).

Product literature for "ToughMet® Alloys, Advanced Bearing Technology," by Brush Wellman Engineered Materials (2003).

Dunlevey, F., "Tech Briefs. Enhancing ToughMet® 3 Bearing Performance with Metalife Hard Coated Steel," by Brush Wellman Inc. (2006).

Product literature for "ToughMet® CX Temper ToughMet® 3," by Brush Wellman (date of first publication unknown).

"Eliminate Friction, Heat, and Vibration," webpage by Nella Enterprises, Inc., http://www.remsuperfinish.com (date of first publication unknown; downloaded Jan. 14, 2010).

"Eliminate Friction, Heat, and Vibration," webpage by Nella Enterprises, Inc., http://www.remsuperfinish.com/rem/rem_benefits.html (date of first publication unknown; downloaded Jan. 14, 2010).

"Surface Improvement = Better Parts," webpage by Nella Enterprises, Inc., http://www.remsuperfinish.comm/about_us.html (date of first publication unknown; downloaded Jan. 14, 2010).

"Recover Horsepower, Improve Your Finish," webpage by Nella Enterprises, Inc., hitp://www.remsuperfinish.comm/rem/faq_main.html (date of first publication unknown; downloaded Jan. 14, 2010).

PCT, International Search Report and Written Opinion, International Application No. PCT/US2011/035280 (Aug. 2, 2011).

* cited by examiner ically coupled by any of a wide variety of manners, such as pins,
GEAR JOINT WITH SUPER FINISHED SURFACES The present invention is directed to a gear joint, and more particularly, to a gear joint such as a ball gear joint with finished surfaces to improve performance.

BACKGROUND

Ball gear joints are often used to rotationally couple various components, such as shafts and rotors in a progressing cavity pump. Certain operating conditions can create increased pressure and loads in the system and on the gear joint. Increased loads will increase friction or heat and can cause increased surface wear in the gear joint, which leads to high joint pressure and ultimately can cause joint failure.

SUMMARY

In one embodiment, the present invention is a gear joint with finished surfaces and other enhancements that allows the gear joint to accommodate higher loads. In particular, in one embodiment, the invention is a ball gear system including a ball gear having a spherical surface, a ring gear configured to receive the ball gear therein and be rotationally coupled thereto, and a thrust plate. The thrust plate is configured to be positioned adjacent to the ball gear to take up thrust forces transmitted thereto. The thrust plate has a recess configured to closely receive the spherical surface therein, and the spherical surface has a surface roughness of less than about 10 Ra in microns.

In another embodiment, the invention is a ball gear system including a ball gear having a spherical surface and a set of ball gear teeth extending circumferentially thereabout, and a ring gear configured to receive the ball gear therein and having a set of ring gear teeth. The ring gear teeth are configured to mesh with the ball gear teeth to rotationally couple the ball gear and the ring gear. Either the set of ring gear teeth or the set of ball gear teeth have a surface roughness of less than about 30 Ra in microns and a hardness greater than the other set of teeth.

DETAILED DESCRIPTION

Figure 1:
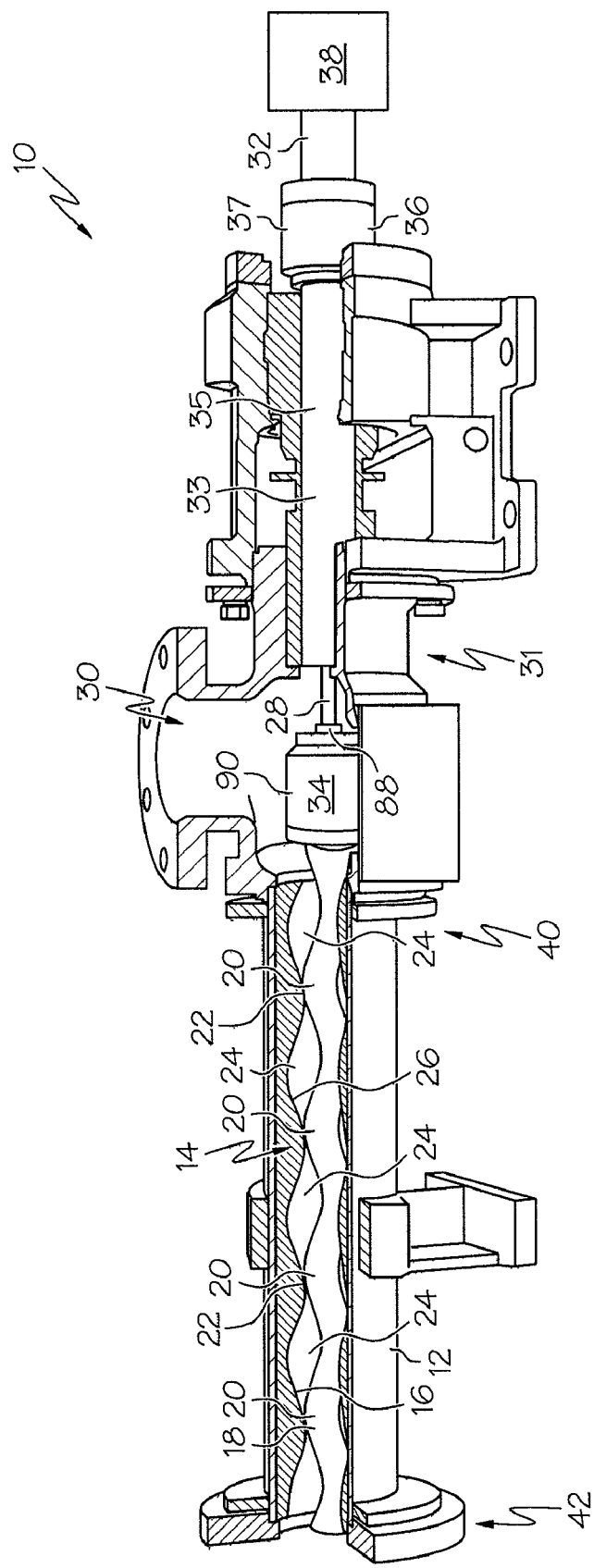
FIG. 1 is a side perspective view of one embodiment of a progressing cavity pump, with part of the pump cut away.

As shown in FIG. 1, a progressing cavity pump 10 may include a generally cylindrical stator tube 12 having a stator 14 located therein. The stator 14 has an opening or internal bore 16 extending generally axially or longitudinally therethrough in the form of a double lead helical nut to provide an internally threaded stator 14. The pump 10 includes an externally threaded rotor 18 in the form of a single lead helical screw rotationally received inside stator 14. The rotor 18 may include a single external helical lobe 20, with the pitch of the lobe 20 being twice the pitch of the internal helical grooves of the stator 14.

The rotor 18 fits within the stator bore 16 to provide a series of helical seal lines 22 where the rotor 18 and stator 14 contact each other or come in close proximity to each other. In particular, the external helical lobe 20 of the rotor 18 and the internal helical grooves of the stator 14 define the plurality of cavities 24 therebetween. The stator 14 has an inner surface 26 which the rotor 18 contacts or nearly contacts to create the cavities 24/seal lines 22.

The pump 10 includes an input section 31 having an input opening 30 into which material to be pumped may be fed. The rotor 18 is rotationally coupled to a connecting rod 28 which is received in a hollow drive shaft 33 having a relative long hollow quill portion 35 and an integral gear joint shell 37. The connecting rod 28 and hollow drive shaft 33 are, in turn, rotationally coupled to a drive shaft 32 at their upstream ends. The connecting rod 28 is coupled to the rotor 18 by a gear joint 34, and is coupled to the drive shaft 32 by a gear joint 36, in a manner which will be described in greater detail below.

The drive shaft 32 is rotationally coupled to a motor 38. When the motor 38 rotates the drive shaft 32, the connecting rod 28 is also rotated, causing the rotor 18 to rotate about its central axis and thus eccentrically rotate within the stator 14. As the rotor 18 turns within the stator 14, the cavities 24 progress from an inlet or suction end 40 of the rotor/stator pair to an outlet or discharge end 42 of the rotor/stator pair. During a single 360° revolution of the rotor 18, one set of cavities 24 is opened or created at the inlet end 40 at exactly the same rate that a second set of cavities 24 is closing or terminating at the outlet end 42 which results in a predictable, pulsationless flow of pumped material.

The pitch length of the stator 14 may be twice that of the rotor 18, and the present embodiment illustrates a rotor/stator assembly combination known as 1:2 profile elements, which means the rotor 18 has a single lead and the stator 14 has two leads. However, the pump 10 can also use any of a variety of rotor/stator configurations, including more complex progressing cavity pumps such as 9:10 designs where the rotor 18 has nine leads and the stator 14 has ten leads. In general, nearly any combination of leads may be used so long as the stator 14 has one more lead than the rotor 18. Progressing cavity pumps are discussed in greater detail in U.S. Pat. Nos. 2,512,764, 2,612,845, 5,722,820, 6,120,267 and 6,491,501, the entire contents of which are incorporated herein by reference.

Figure 2A:
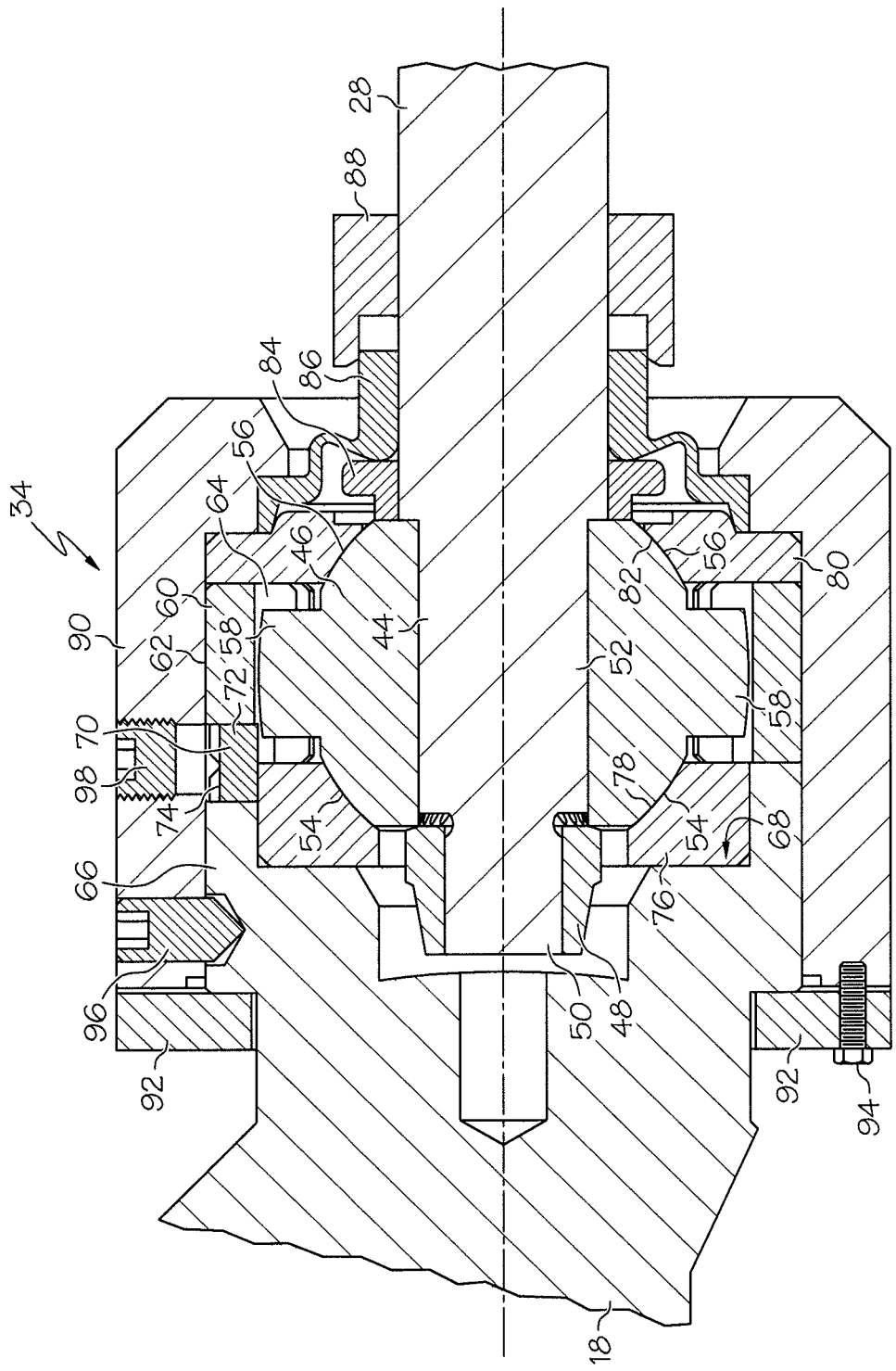
FIG. 2A is a side cross section of a gear joint at the rotor end of the pump of FIG. 1.
Figure 2B:
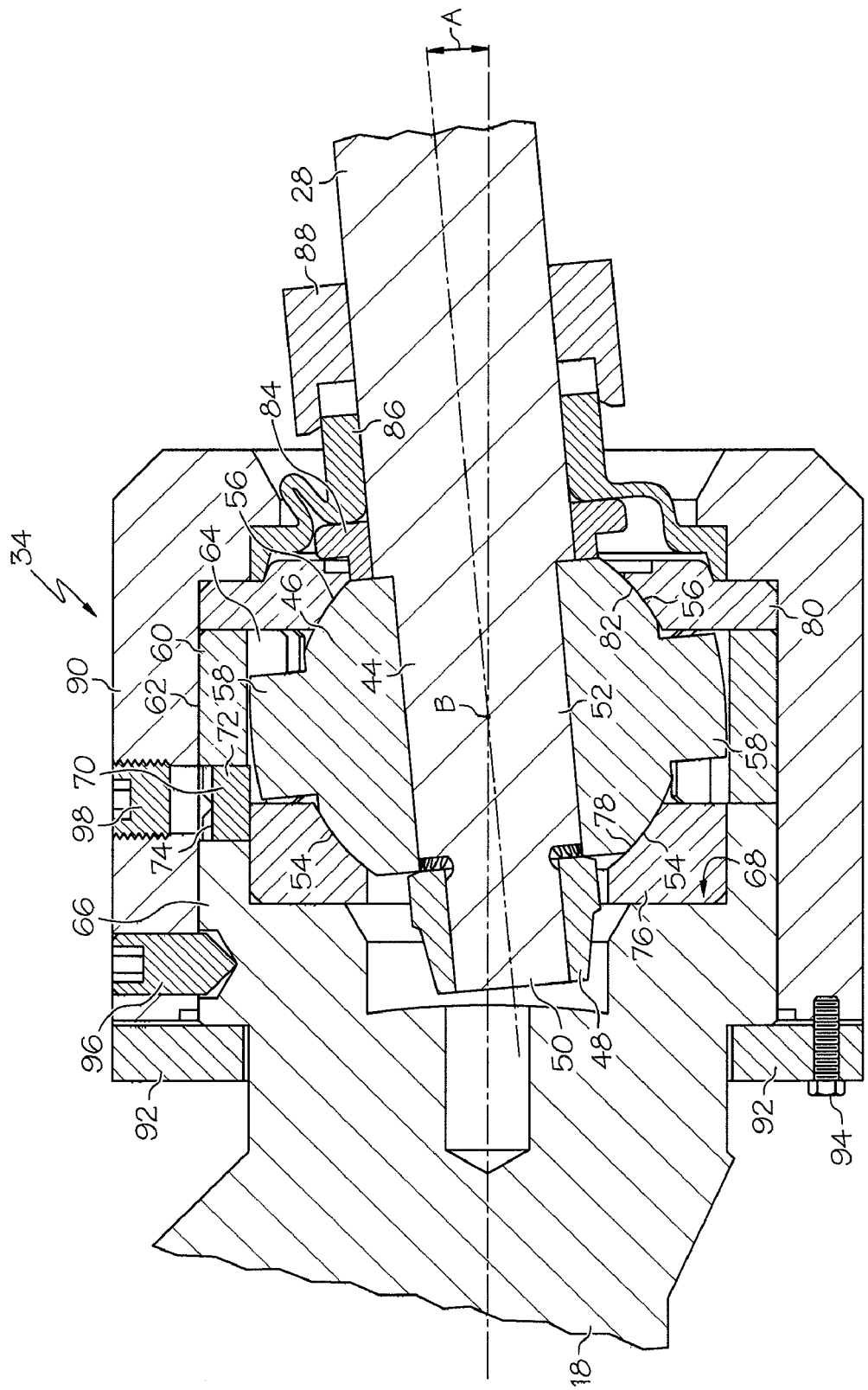
FIG. 2B is a side cross section of the gear joint of FIG. 2A, with the shaft moved to a different position.
Figure 3:
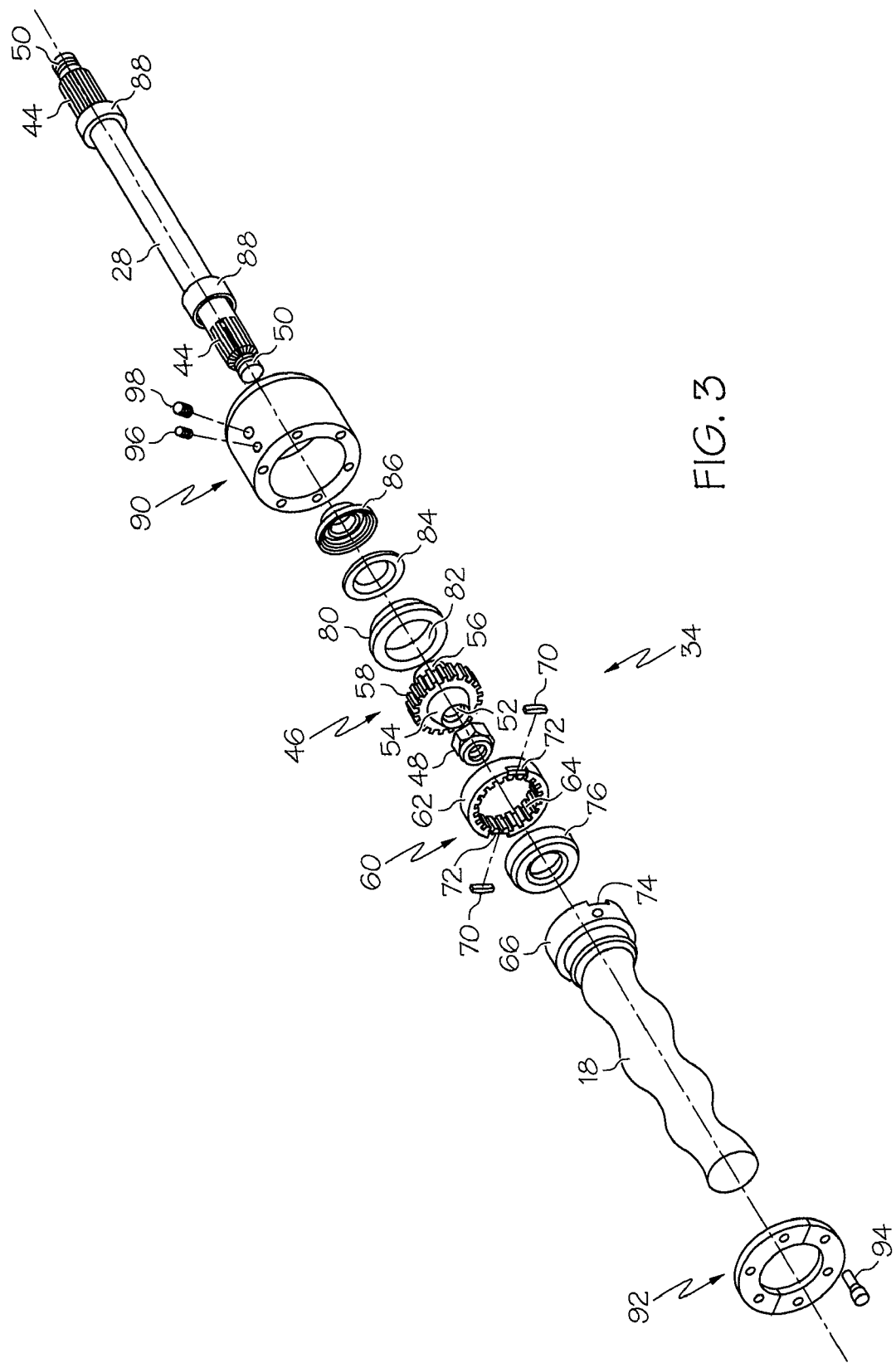
FIG. 3 is a rear exploded perspective view of the rotor, connecting rod and gear joint of the pump of FIG. 1.
Figure 4:
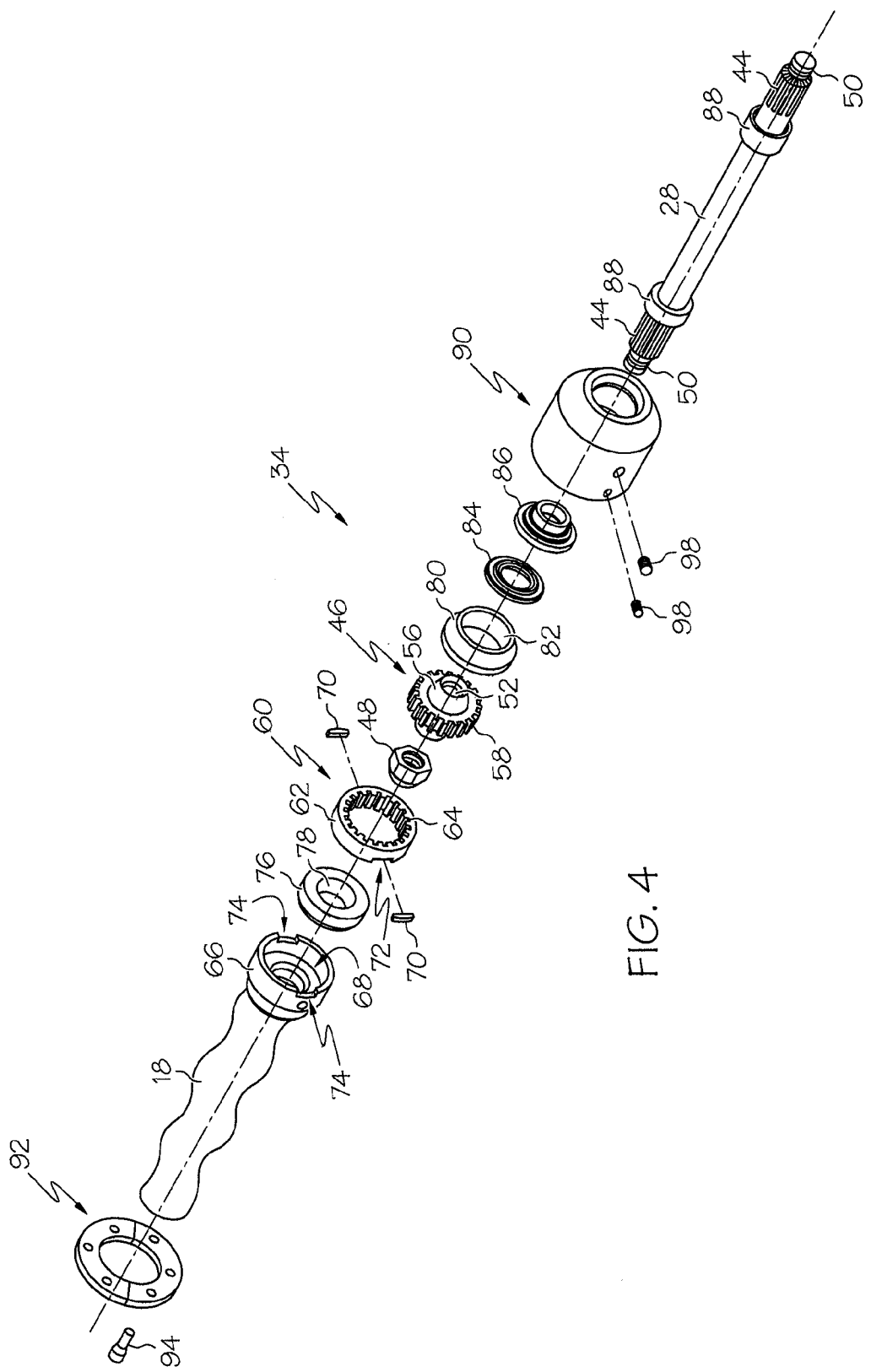
FIG. 4 is a front exploded perspective view of the rotor, connecting rod and gear joint of the pump of FIG. 1.

As best shown in FIGS. 2A, 2B, 3 and 4, the connecting rod 28 includes a smaller diameter shaft portion 44 at or adjacent to an end thereof which protrudes through the ball gear joint 34. The shaft portion 44 of the connecting rod 28 is received through a ball gear 46 and a nut 48 is threaded onto a distal/protruding end 50 of the rod 28 to secure the connecting rod 28 in place. As shown in FIGS. 3 and 4, the shaft portion 44 may be splined, and the ball gear 46 may have an opening 52 formed therethrough with axially-extending grooves to rotationally couple the connecting rod 28 and ball gear 46. However, the ball gear 46 and connecting rod 28 can be rotationally coupled by any of a wide variety of manners, such as pins, frictional fits, keys, interengaging geometries, etc.

The ball gear 46 may be generally spherical, or have generally spherical or partially spherical opposed outer surfaces 54, 56 (following industry convention, a surface which has a spherical profile or surface, yet is not necessarily a complete sphere, is nevertheless described herein as spherical). The illustrated ball gear 46 carries a set of teeth 58 extending radially outwardly and arranged circumferentially around the ball gear 46. A ring gear 60 is positioned about the ball gear 46 and receives the ball gear 46 therein. The ring gear 60, in the illustrated embodiment, includes a relatively smooth circumferential outer surface 62, and includes radially-inwardly extending teeth 64 which mesh with the teeth 58 of the ball gear 46 to rotationally couple the ball gear 46 and ring gear 60.

The rotor 18 includes a rotor head 66 at an axial end thereof, the rotor head 66 including a recess 68 at an end thereof. The rotor 18 is rotationally coupled to the ring gear 60 by one or more keys 70 (see FIGS. 2A and 2B, which illustrate one key 70, and FIGS. 3 and 4 which illustrate both keys 70) received in corresponding grooves 72 in the ring gear 60 and grooves 74 in the rotor head 66.

A primary thrust plate 76 is positioned generally between the ball gear 46 and the rotor 18/rotor head 66 to accommodate thrust forces and is at least partially received in the rotor head recess 68. The axially inner surface 78 (i.e., the surface facing the ball gear 46) of the primary thrust plate 76 is spherical and defines a recess with a shape/diameter matching the spherical surface 54 of the ball gear 46 to define a shape matching the ball gear 46. In this manner, any primary thrust forces from the connecting rod 28 (i.e., thrust forces applied in the right-to-left direction of FIGS. 2A and 2B) are transmitted to the ball gear 46, and thereby to the primary thrust plate 76, which takes up/distributes the thrust forces to avoid damaging other components in the ball gear joint 34. The ball gear joint 34 may also include a secondary thrust plate 80 positioned on the opposite (i.e., upstream) end of the ball gear 46 to accommodate thrust forces applied in the opposite direction (i.e., left-to-right direction). The secondary thrust plate 80 has a spherical inner surface 82 shaped to engage the spherical surface 56 of the ball gear 46.

A sealing collar 84 and pliable seal 86 are positioned about the connecting rod 28 and adjacent to the ball gear 46/secondary thrust plate 80 to seal and fluidly isolate the ball gear joint 34. A seal retainer 88 is carried on the connecting rod 28 and receives part of the seal 86 therein to retain the seal 86 in place. A gear joint shell 90 is positioned about the sealing collar 84, seal 86, primary 76 and secondary 80 thrust plates, ball gear 46, ring gear 60, shaft portion 44 and rotor head 66, and coupled to the rotor head 66 to fluidly protect and seal those components.

A gear head ring 92, which extends around the rotor head 66, is coupled to the body of the gear shell 90 by a plurality of fasteners 94 spaced around the perimeter of the gear head ring 92 to generally close off the gear joint 34. A set screw 96 may extend through the gear shell 90 and engage the rotor head 66 to further couple the shell 90 and rotor head 66. Another set screw 98 extends through the gear shell 90 to allow lubrication access such that any cavities in the joint 34 are filled with grease.

As shown in FIG. 2A, at certain times the connecting rod 28 may be generally axially aligned with the central axis of the gear joint 34 and/or rotor 18. At other times during operation of the pump 10, particularly during the eccentric rotation of the rotor 18, the connecting rod 28 may be positioned at angle relative to the central axis of the gear joint 34/rotor 18. For example, FIG. 2B illustrates the connecting rod 28 forming an angle A relative to the central axis of the gear joint 34/rotor 18. However, the ball gear joint 34 allows the connecting rod 28 to pivot to various angular positions while still maintaining a seal and transmitting rotation.

In particular, pivoting of the connecting rod 28 causes the ball gear 46 to pivot about its central axis B relative to the ring gear 60 and thrust plates 76, 80. The spherical engagement surfaces 54, 56 of the ball gear 46 engage and slide along spherical engagement surfaces 78, 82 of the thrust plates 76, 80 to smoothly guide the rotation of the ball gear 46 about its central axis B. The ball gear teeth 58 and the ring gear teeth 64 overlap in the radial direction sufficiently to ensure that the teeth 58, 64 remain intermeshed, even when the ball gear 46 is pivoted. The connecting rod 28 can also pivot into and out of the plane of the sheets of FIGS. 2A and 2B, and the spherical surfaces 54, 56, 78, 82 smoothly guide such pivoting. This design of the gear joint 34 enables radial and axial loads to be separately transmitted enabling higher loads to be accommodated during operation. The ball gear joint 36 (FIG. 1) is received in the gear joint shell 37 and rotationally couples the connecting rod 28 to the motor 38/drive shaft 32 utilizing the same or similar principles to those described above for the gear joint 34.

FIGS. 2A, 2B, 3 and 4 illustrate one embodiment of a ball gear joint 34 in which the ball gear joint 34 has a size generally in proportion to the rotor head 18. In some cases, however, it may be desired to provide a de-rated design in which greater loads and forces are applied to the ball gear joint 34 which may make existing ball gear joints unacceptable for such demanding service. In addition, various other loading forces can impose stress upon the ball gear joint 34, leading to compromised performance.

In particular, the engagement between the spherical surfaces 54, 56 of the ball gear 46 and the corresponding spherical recesses 78, 82 of the thrust plates 76, 80 may require attention. For example, when the surface area of the spherical surfaces 54, 56, 78, 82 are decreased, the same thrust forces may cause higher pressures to be exerted on the surfaces, which may cause peaks or relatively high points of the surfaces to be broken off into particles which can then be trapped between the spherical surfaces 54, 56, 78, 82. Such particles can, in some cases, cause visible scoring in the spherical surfaces 54, 56, 78, 82. The presence of the particles increases friction, thereby generating heat which can cause gassing in the lubricating grease of the joint 34. Such increased heat can cause decreased performance of the gear joint 34, and ultimately cause seal failure in some cases. Similar issues can apply to the teeth 58, 64 of the ball gear 46 and ring gear 60, respectively, as pressure applied to smaller surfaces can lead to more particles being introduced into the grease.

Accordingly, in order to provide a higher-performing gear joint, one or both of the spherical surfaces 54, 56 of the ball gear 46 may be finished to a highly smooth surface. In particular, the spherical surfaces 54, 56 of the ball gear 46 may be finished to a surface roughness of less than about 10 Ra (in microns), although in other cases, a surface roughness of less than about 5 Ra, or even 2 Ra, may be desired. The surface roughness may be measured based on the ASME Y14.36M-1996 standard. It has been found that a surface roughness of less than about 10 Ra on the spherical surfaces 54, 56 is important to reducing heat (due to friction) and wear under the loading conditions experienced by ball gear joints 34 to prevent joint failure and increase performance.

The teeth 64 of the ring gear 60 and/or the teeth 58 of the ball gear 46 (and more particularly, the flank or engagement surfaces of the teeth 64, 58), may be also finished to reduce surface roughness, in one case to a surface roughness of less than about 30 Ra. Although it may be desired in some cases to finish the teeth 64, 58 to a smoothness equal to the surface roughness of the spherical surfaces 54, 56 (i.e. less than about 10 Ra), in some cases due to manufacturing limitations (and in particular limited access to the flank of the teeth 58, 64) it is not practical to achieve the same smoothness. It has been found that a surface roughness of less than about 30 Ra on the teeth 64, 58 is important to reducing heat (due to friction) and wear under the loading conditions experienced by ball gear joints 34 to prevent joint failure and increase performance. A lesser surface roughness may be acceptable on the teeth 64, 58 as compared to the spherical surfaces 54, 56 due to the increased hardness and lesser mating surface area of those components.

The desired surface roughness of the surfaces 54, 56, 58, 64 may be provided by any of a wide variety of finishing processes. However, in one embodiment, an isotropic superfinish process is utilized, such as a process offered by REM Chemicals, Inc., of Southington, Conn., and/or the processes described in U.S. Pat. Nos. 4,491,500; 4,705,594; 4,818,333; and 4,906,327 (the entire contents of all four of these patents are incorporated by reference herein). These types of finish processes may reduce surface roughness by a combination of chemical treatments and agitations. In addition, desired smoothness/low surface roughness can be provided by any of a wide variety of other methods, such as electropolishing, a tumbling media treatment, supergriding or crush grinding. When the ball gear 46 is treated, the spherical surfaces 54, 56 and its teeth 58 may all be simultaneously finished to the desired surface roughness.

It is not necessarily desired to have the thrust plates 76, 80 finished to the same smoothness as the spherical surfaces 54, 56 of the ball gear 46, as it has been found that two smooth surfaces may tend to stick together and therefore impede performance, particularly given the relatively high surfaces pressures on the mating surfaces 54, 56 and 78, 82, and given the relative softness of the thrust plates 76, 80 relative to the spherical surfaces 54, 56 (as described below). Thus it has been found that the thrust plates 76, 80 may be desired to have a surface roughness greater than the spherical surfaces 54, 56. For example, the thrust plates 76, 80 may each have a surface roughness on their spherical surfaces/recesses 78, 82 of greater than about 10 Ra in some cases, or greater than about 50 Ra in other cases.

Although it may be desired for the thrust plates 76, 80 to have a greater surface roughness than the spherical surfaces 54, 56 of the ball gear 46, this may not necessarily be the case for the teeth 58, 60. In particular, in some cases the ball gear teeth 58 and ring gear teeth 60 may each have about the same roughness (less than about 30 Ra in one case) due to the harder materials, and lesser mating surface areas, of those components.

When the roughness of the spherical surfaces 54, 56 and/or teeth 58, 64 are decreased, the extremely smooth surface can create such a tight fit with the mating surfaces that sufficient lubrication is prevented from reaching the contact surfaces. This, in turn, can lead to increased scoring of the thrust plates 76,80/teeth 58, 64 which contributes particles to the gear joint 34, ultimately leading to elevated temperatures and potential failure. Accordingly, the thrust plates 76, 80 and/or teeth 58, 64 may be desired to be made of a relatively hard material which resists scoring (and, therefore, contribution of particles), and which is self lubricating.

In one case, the thrust plates 76, 80 may be made of material having a hardness of at least about 20 Rc, or at least about 30 Rc on the "C" Rockwell Scale. It has been found that material with at least these levels of hardness resist wear and deformation under high load conditions. The thrust plates 76, 80 can be made of any of a wide variety of materials which provide the desired qualities, such as an alloy made of leaded bronze (CDA 932), aluminum bronze (CDA 954), or bronze. In one case, however, the thrust plates 76, 80 are made of TOUGHMET® copper, nickel and tin alloy (Temper T3 CX 105) or EQUACAST® alloy sold by Brush Wellman Inc. of Mayfield Heights, Ohio.

Although the thrust plates 76, 80 may be made of a relative hard and durable material, it may be desirable that the thrust plates 76, 80 are made of a softer material than the spherical surfaces 54, 56 of the ball gear 46 so that the thrust plates 76, 80 operate as a sacrificial part, and to avoid the generation of excess heat. The thrust plates 76, 80 may be designed to be cheaper and easier to access so that they can be replaced as desired. In addition, since the ball gear 46 is the harder component, its smoother, superfinished surfaces 54, 56 retain their smooth qualities for longer periods of time.

In one embodiment, the spherical surfaces 54, 56 of the ball gear 46 have a hardness of at least about 55 Rc, or between about 55-60 Rc, or at least between about 55-60 Rc. It has been found that this level of hardness is sufficient to resist wear and deformation under high load conditions. As noted above, since the thrust plates 76, 80 may have a lesser hardness than the spherical surfaces 54, 56, the thrust plates 76, 80 may have a hardness of between about 20/30 Rc and about 55/60 Rc. If the relative hardness of the spherical surfaces 54, 56 of ball gear 46 is too high, the ball gear 46 can cause excessive wear on the thrust plates 76, 80. On the other hand, if the relative hardness is too low, the spherical surfaces 54, 56 of the ball gear 46 may show excessive wear themselves.

Similar design considerations may also apply to the teeth 58 of the ball gear 46 compared to the teeth 64 of the ring gear 60. In particular, the teeth 64 of the ring gear 60 may be made of softer material than the teeth 58 of the ball gear 46. In one case the teeth 64 of the ring gear 60 have a hardness of at least about 50 Rc, or between about 50 and about 55 Rc, or more particularly between about 53 and about 55 Rc, or less than about 55 or about 53 Rc. The teeth 58 of the ball gear 46 may have the same hardness and roughness as the spherical surfaces 54, 56 described above. If desired, however, the relative hardness described above may be reversed such that the teeth 64 of the ring gear 60 are harder than the teeth 58 of the ball gear 46.

The ball gear 46 and ring gear 60 can be made of any of a wide variety of materials, but in one case the ball gear 46, including the spherical surfaces 54, 56 and teeth 58 is made of hardened 8620 alloy steel, and the ring gear 60, including the teeth 64, is made of hardened 4150 alloy steel. In some cases it may be desirable to have the hardness and/or roughness of the corresponding parts to be different, but not too different, so that the parts wear well, but that the softer/rougher part does not wear out too fast. For example, in one case the hardness and smoothness of the spherical surfaces 54, 56 is no more than about 50% greater than the hardness and/or smoothness, respectively of the spherical recess 78, 82 of the associated thrust plates 76, 70. In addition, in one case the hardness and/or smoothness of the ball gear teeth 58 is no greater than about 50% greater than the hardness and smoothness, respectively of the ring gear teeth 64, or vice versa.

The increased pressures and tight tolerances provided by the ball gear joint 34 described herein also require a high performance/extreme performance grease which can accommodate such forces while still providing sufficient lubrication. The desired grease may be a synthetic grease with a lithium-based additive (in the form of a lithium complex soap thickener) which can withstand high temperatures and high pressures, and meet the NLGI (National Lubricating Grease Institute) grade 2 standards. In particular, the grease should be an extreme performance grease able to withstand high temperatures and high pressures without offgassing, have a low evaporation rate, and maintain its viscosity. The grease may have a water wash out of 6% by weight at seventy nine degrees C. as measured under ASTM D1264 testing standards; a vapor pressure of less than 0.13 kPa or less or 0.1 m Hg at twenty degrees C.; a dropping point of greater than 250 degrees C.; a range of operating temperatures between −40 degrees C. and 150 degrees C.; and a Timken OK load of 45 pounds, as measured under ASTM D2509 testing standards. The grease should also be compatible with the elastomer material used for the gear joint seal assembly 84, 86. Such a grease meeting these specifications may be available from Moyno, Inc. of Springfield Ohio.

The arrangement described above, in which smoothness and hardness of the spherical surfaces 54, 56 of the ball gear 46 and the teeth 58, 64 have been improved, along with the use of an acceptable grease, has been found to decrease the temperature of the joint 34 during operation by at least about 20%, leading to a subsequent pressure decrease within the joint 34. In addition, the arrangement described above has been shown to provide an average increase of at least 50% of PV (pressure velocity factor). This arrangement has also been found to improve the gear joint 34 such that in one case it runs at least 20% lower temperatures, and a lower stable pressure, and has approximately 80% less wear on the internal components.

The gear joint 34 described herein also has been found to almost completely eliminate the break-in period in some cases. In particular, when most gear joints 34 are first operated there is a break-in period in which peaks or high points of the spherical surfaces 54, 56, 78, 80 and teeth 58, 64 are scored or ground off, creating a spike in temperature until the system stabilizes (i.e. as particles tend to settle away from wear surfaces or become embedded in other surface). However, the highly-finished gear joint 34 arrangement significantly reduces the break-in period of mating surfaces.

Having described the invention in detail and by reference to certain embodiments, it will be apparent that modifications and variations thereof are possible without departing from the scope of the invention.

What is claimed is:

1. A ball gear system comprising:
    a ball gear having a spherical surface;
    a ring gear configured to receive said ball gear therein and be rotationally coupled thereto; and
    a thrust plate configured to be positioned adjacent to said ball gear to take up thrust forces transmitted thereto, said thrust plate having a recess configured to closely receive said spherical surface therein, wherein said spherical surface has a surface roughness of less than about 10 Ra in microns, wherein said recess of said thrust plate has a surface roughness greater than said surface roughness of said spherical surface, and has a hardness of at least about 20 Rc.

2. The system of claim 1 wherein said spherical surface has a hardness of at least about 55 Rc.

3. The system of claim 1 wherein said spherical surface has a hardness greater than a hardness of said recess of said thrust plate.

4. The system of claim 3 wherein said thrust plate has a hardness of at least about 30 Rc.

5. The system of claim 4 wherein said thrust plate is made of a hardened copper-nickel-tin alloy or a self lubricating material.

6. The system of claim 3 wherein said spherical surface has a hardness that is no more than about 50% greater than said hardness of said recess of said thrust plate.

7. The system of claim 1 wherein said spherical surface is finished to said desired surface roughness by an isotropic super finish process.

8. The system of claim 1 wherein said ball gear includes a supplemental spherical surface positioned on an opposite side of said ball gear relative to said spherical surface, said supplemental spherical surface having a surface roughness of less than about 10 Ra in microns, said ball gear system including a supplemental thrust plate configured to be positioned adjacent to said supplemental spherical surface to take up thrust forces transmitted thereto.

9. The system of claim 1 wherein said ring gear receives said ball gear therein and is rotationally coupled thereto, and wherein the system further includes a shaft which is rotationally coupled to at least one of said ring gear or said ball gear, and said thrust plate is positioned between said ball gear and said shaft to take up thrust forces transmitted thereto.

10. The system of claim 9 wherein said shaft is a rotor and wherein the system further includes a stator receiving said rotor therein to form a progressing cavity pump.

11. The system of claim 9 wherein said shaft is a connecting rod having a ball gear joint at either end thereof.

12. The system of claim 1 wherein said ball gear has a set of ball gear teeth extending circumferentially thereabout, and wherein said ring gear has a set of ring gear teeth configured to mesh with said ball gear teeth to rotationally couple said ball gear and said ring gear, and wherein at least one of said sets of teeth have a surface roughness of less than about 30 Ra in microns.

13. The system of claim 12 wherein both of said sets of teeth have a surface roughness of less than about 30 Ra in microns.

14. The system of claim 12 wherein said ring gear teeth have a hardness less than said ball gear teeth, and said ring gear teeth have a hardness of at least about 50 Rc.

15. The system of claim 1 wherein the ball gear has a set of ball gear teeth extending circumferentially thereabout, and wherein the ring gear has a set of ring gear teeth configured to mesh with said ball gear teeth to rotationally couple said ball gear and said ring gear, wherein said spherical surface has a hardness greater than a hardness of said recess of said thrust plate by not more than about 50%, wherein said set of ball gear teeth have a surface roughness of less than about 30 Ra in microns and a hardness greater than the set of ring gear teeth, wherein said thrust plate is made of a hardened copper-nickel-tin alloy or a self lubricating material.

16. A ball gear system comprising:
    a ball gear having a spherical surface;
    a ring gear configured to receive said ball gear therein and be rotationally coupled thereto; and
    a thrust plate configured to be positioned adjacent to said ball gear to take up thrust forces transmitted thereto, said thrust plate having a recess configured to closely receive said spherical surface therein, wherein said spherical surface has a hardness greater than a hardness of said recess of said thrust plate and wherein said recess of said thrust plate has a surface roughness that is greater than said surface roughness of said spherical surface, and wherein said spherical surface has a surface roughness of less than about 10 Ra in microns.

17. A ball gear system comprising:
    a ball gear having a spherical surface and a set of ball gear teeth extending circumferentially thereabout;
    a ring gear configured to receive said ball gear therein and having a set of ring gear teeth configured to mesh with said ball gear teeth to rotationally couple said ball gear and said ring gear, wherein at least one of said set of ring gear teeth or said set of ball gear teeth have a surface roughness of less than about 30 Ra in microns and a hardness greater than the other set of teeth, wherein said set of ball gear teeth have a surface roughness of less than about 30 Ra in microns and a hardness greater than the set of ring gear teeth.

18. The system of claim 17 wherein said set of ring gear teeth have a hardness of at least about 50 Rc.

19. The system of claim 17 further comprising a thrust plate configured to be positioned adjacent to said ball gear to take up thrust forces transmitted thereto, said thrust plate having a recess configured to closely receive said spherical surface therein, wherein said spherical surface of said ball gear has a surface roughness of less than about 10 Ra in microns.

20. The system of claim 19 wherein said spherical surface has a hardness greater than a hardness of said recess of said thrust plate.

21. The system of claim 19 wherein said recess of said thrust plate has a surface roughness that is greater than said surface roughness of said spherical surface.

22. The system of claim 19 wherein said spherical surface has a hardness at least about 55 Rc and wherein said thrust plate has a hardness of at least about 30 Rc but less than a hardness of said spherical surface.

* * * * *